United States Patent [19]

Maclean et al.

[11] Patent Number: 4,687,498
[45] Date of Patent: Aug. 18, 1987

[54] ARGON RECOVERY FROM HYDROGEN DEPLETED AMMONIA PLANT PURGE GAS UTILIZING A COMBINATION OF CRYOGENIC AND NON-CRYOGENIC SEPARATING MEANS

[75] Inventors: Donald L. Maclean, Annandale; Ramachandran Krishnamurthy, Cranbury; Steven L. Lerner, Berkeley Heights, all of N.J.

[73] Assignee: The Boc Group, Inc., Montvale, N.J.

[21] Appl. No.: 832,205

[22] Filed: Feb. 24, 1986

[51] Int. Cl.$^4$ .............................................. F25J 3/00
[52] U.S. Cl. ........................................ 62/17; 62/22; 55/66
[58] Field of Search ................... 62/17, 18, 22; 55/66

[56] References Cited

U.S. PATENT DOCUMENTS

| | | | |
|---|---|---|---|
| 2,944,627 | 7/1960 | Skarstrom | 55/75 |
| 3,801,513 | 4/1974 | Munzner et al. | 55/75 |
| 3,838,553 | 10/1974 | Doherty | 55/66 |
| 3,866,428 | 2/1975 | Simonet et al. | 62/17 |
| 3,960,522 | 6/1976 | Munzner et al. | 55/75 |
| 3,986,849 | 10/1976 | Fuderer et al. | 55/66 |
| 3,996,028 | 10/1976 | Golovko et al. | 55/66 |
| 4,336,044 | 6/1982 | Barker et al. | 62/17 |
| 4,340,398 | 7/1982 | Doshi et al. | 55/75 |
| 4,415,340 | 11/1983 | Knoblauch et al. | 55/75 |
| 4,417,909 | 11/1983 | Weltmer, Jr. | 62/22 |
| 4,529,412 | 7/1985 | Hayashi et al. | 55/66 |

Primary Examiner—Ronald C. Capossela
Attorney, Agent, or Firm—Larry R. Cassett; Chris P. Konkol

[57] ABSTRACT

An improved process is disclosed for argon recovery from an ammonia synthesis plant purge gas stream comprising hydrogen, nitrogen, argon, methane, and ammonia. This purge gas is conventionally subjected to ammonia absorption and a first membrane separation of hydrogen for recycle to the ammonia plant. The hydrogen depleted non-permeate gas stream from the first membrane separator, comprising the aforesaid four components, and any residual moisture from the ammonia absorption, is subjected, according to a first embodiment of the present invention, to the following steps: (i) Separation of methane and residual moisture and most of the nitrogen in the gas stream in a pressure swing adsorption system using molecular sieve or activated carbon material. (ii) Separation of most of the hydrogen in a second membrane separator. The separated hydrogen may be used as purge gas for regeneration of the pressure swing adsorption systems of step (i). (iii) Separation of the nitrogen and residual hydrogen by cryogenic distillation to obtain essentially pure liquid argon product. In a second embodiment, step (ii) above is eliminated and separation of hydrogen is accomplished by cryogenic separation in combination with step (iii). In a third embodiment, separation of most of the hydrogen is accomplished by metal hydride adsorption in place of membrane separation. The present process is equally applicable with minor modifications for the recovery of argon from ammonia synthesis plant purge gas streams, wherein PSA or cryogenic units are employed instead of the first membrane separator, in order to recover hydrogen for recycle to the ammonia synthesis plant.

30 Claims, 4 Drawing Figures

ARGON RECOVERY FROM HYDROGEN DEPLETED AMMONIA PLANT PURGE GAS UTILIZING A COMBINATION OF CRYOGENIC AND NON-CRYOGENIC SEPARATING MEANS

BACKGROUND OF THE INVENTION

The economic production of argon via air separation plants is linked to the production of equivalent quantities of nitrogen or oxygen or both. In recent years, the demand for argon has been growing at a more rapid rate than the corresponding growth rate of either nitrogen or oxygen. Alternative sources for argon has thus become very attractive. One such alternative source is the purge gas from an ammonia synthesis plant.

In an ammonia synthesis plant, it becomes necessary to purge a fraction of the gas stream in order to maintain the inert concentration below a specified level. Undesirably high inert levels reduce the partial pressure of the reactants and cause an unfavorable shift of the ammonia synthesis reaction equilibrium. Methane and argon are the inert gases of concern. A typical composition of the ammonia purge gas, available at approximately 1900 psig, is as follows: 60.5% $H_2$, 20% $N_2$, 4.5% Ar, 13% $CH_4$ and 2% $NH_3$.

Since the ammonia synthesis process is energy intensive, economics have favored recovery of the hydrogen in the purge gas for recycle to the ammonia synthesis loop. Currently, three kinds of processes are employed for this purpose; in order of most to least prevalent, these are membrane separation, cryogenic separation and pressure swing adsorption separation. In fact, the use of a membrane separator has become very popular for hydrogen recovery and recycle, and a number of ammonia plants in the United States and abroad have hydrogen membrane separator units installed.

Present technology for argon recovery from ammonia synthesis plant purge gas does not optimally integrate this hydrogen membrane separator, but rather employs a cryogenic process that consists of a pre-treatment section for ammonia removal and three subsequent separatory columns. In such a conventional design, the first two columns are for stripping hydrogen and nitrogen in the feed gas and the final column is for separating argon and methane to obtain pure liquid argon product and also pure methane for use as fuel.

The primary object of the invention was to develop an improved process for the recovery of argon from ammonia plant purge gas. A further object of the present invention was to develop a process employing an advantageous combination of non-cryogenic and cryogenic separatory steps for post membrane recovery of argon from the non-permeate gas stream. Yet a further object of the present invention was to develop a PSA system to accomplish removal of methane in the purge gas exiting an ammonia synthesis plant.

In the following description of the invention, the term "pressure swing adsorption" or its acronym "PSA" is used in reference to a type of process and apparatus that is now well known and widely used with respect to separating the components of a gaseous mixture. A PSA system basically comprises passing a feed gas mixture through one or more adsorption beds containing a sieve material which has a greater selectivity for a more strongly adsorbed component than a more weakly adsorbed component of the gas mixture. In the operation of a typical 2-bed PSA system, the connecting conduits, valves, timers, and the like are coordinated and arranged so that when adsorption is occurring in a first bed, regeneration is occurring in a second bed. In the usual cycle, sequential steps with respect to each bed include bed pressurization, product release and venting. Basic PSA systems are described in U.S. Pat. No. 2,944,627, U.S. Pat. No. 3,801,513, and U.S. Pat. No. 3,960,522.

Various modifications and improvements to the basic PSA process and apparatus have been described in the literature, for example, in U.S. Pat. No. 4,415,340, issued on Nov. 15, 1983 and U.S. Pat. No. 4,340,398 issued on July 20, 1982.

The present invention is not limited to the use of any particular PSA process or apparatus design. A specific design that leads to high argon yield is, however, detailed below as an example.

BRIEF DESCRIPTION OF THE INVENTION

A new and improved process has been developed for recovering argon from the purge gas stream originating from an ammonia synthesis plant. This process employs a combination of non-cryogenic means and cryogenic means. The non-cryogenic means comprises a pressure swing adsorption (PSA) unit which accomplishes the critical removal of methane as well as removal of most of the nitrogen.

The ammonia synthesis plant purge gas stream comprises hydrogen, nitrogen, argon, methane, and ammonia. This purge gas is conventionally subjected to ammonia absorption and a first membrane separation of hydrogen for recycle to the ammonia plant. The hydrogen depleted non-permeate gas stream from the first membrane separator, compising the aforesaid four components, and any residual moisture from the ammonia absorption, is subjected, according to a first embodiment of the present invention, to the following steps:

(i) Separation of methane and residual moisture and most of the nitrogen in the gas stream in a pressure swing adsorption system using molecular sieve or activated carbon material.

(ii) Separation of most of the hydrogen in a second membrane separator. The separated hydrogen may be used as purge gas for regeneration of the pressure swing adsorption systems of step (i).

(iii) Separation of the nitrogen and residual hydrogen by cryogenic distillation to obtain essentially pure liquid argon product.

A second embodiment of the present invention comprises the following steps:

(i) The post membrane purge gas is passed to a PSA system where all of the methane and residual moisture in the feed gas and most of the nitrogen are removed.

(ii) The product gas from the PSA is passed to a cryogenic distillation unit after pre-cooling with cold waste gas from the distillation unit and optional expansion to a desired lower pressure. In a single column, pure liquid argon is produced as a bottom product, whereas the distillate or top product is a hydrogen nitrogen mixture. The distillate may be used as a purge gas for PSA regeneration after heat exchange with the PSA product.

In a third embodiment, hydrogen in the non-permeate stream is separated by using metal hydrides employing a pressure swing cycle. The hydrides used for hydrogen separation and the molecular sieve used for methane and nitrogen separation can be combined in a single PSA process.

It will be appreciated by those skilled in the art that although the process described by each of the three embodiments above is with reference to a post membrane purge gas, the present invention can be applied to treat waste gas from a PSA or cryogenic unit rather than a membrane separator when these are employed to recover hydrogen for recycle to the ammonia synthesis plant. In this case, two minor process modifications should be made. First, the feed gas is compressed to a desired PSA operating pressure and, second, if ammonia is present in the feed, the PSA process for methane separation is suitably modified to simultaneously remove ammonia.

The present invention has several important advantages over the prior art's three stage cryogenic recovery of argon. A considerable reduction in capital cost and operating expense is achieved through the use of a gas phase methane separation. In fact, the high pressure of the purge gas exiting from the ammonia synthesis plant can be used to provide most or all of the energy requirements in the non-cryogenic separation. Furthermore, it is possible, as a further energy saving measure, to pass the high pressure purge gas stream through a turbine in order to provide cooling needed for the cryogenic separation. In addition, the compact units employed in the present process are more portable and, as a result, the purge gas available at numerous ammonia plant sites over a wide geographical range can be more expeditiously tapped to meet the growing demand for argon. Finally, the PSA unit for separating methane in the present invention also performs the function of removing trace levels of water and ammonia, whereas prior art cryogenic methods for argon recovery typically require a separate adsorption unit to perform this function.

The process and apparatus according to the invention will now be described by way of examples with reference to the accompanying drawings.

BRIEF DESCRIPTION OF THE DRAWINGS

The invention will be more clearly understood by reference to the following description of exemplary embodiments thereof in conjunction with the following drawings in which.

DETAILED DESCRIPTION OF THE INVENTION

Figure 1:
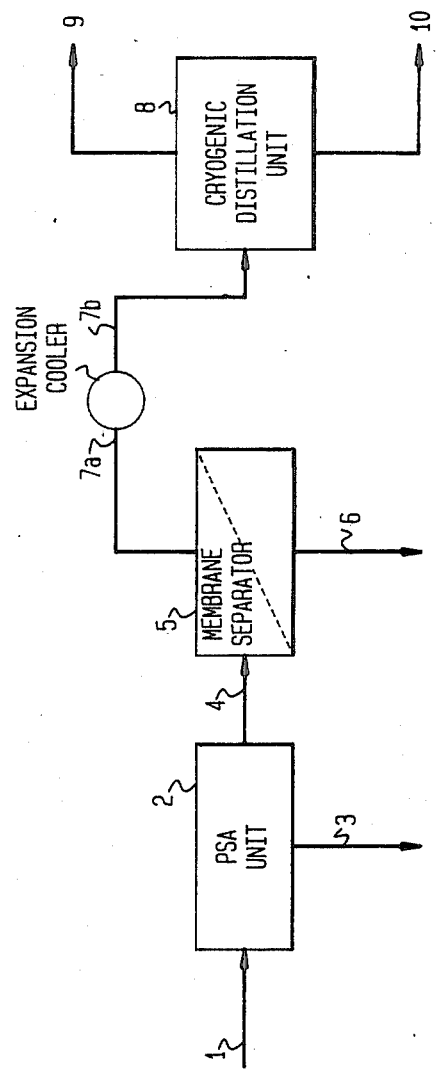
FIG. 1 is a box diagram illustrating a first embodiment of the present invention in which argon is recovered from a multicomponent gas stream.

An ammonia absorber and hydrogen membrane separator conventionally treats the purge gas exiting from a ammonia synthesis plant. As exemplified by Monsanto's PRISM$^R$ membrane separator system, hydrogen membrane separators are well known in the art for treating ammonia synthesis plant purge gas in order to obtain recyclable hydrogen. Referring to FIG. 1, illustrating a first embodiment of the present invention, the non-permeate gas stream 1, from a hydrogen membrane separator comprises argon, hydrogen, methane and nitrogen.

The non-permeate gas typically has a composition, by volume, in the following range: 7-20% hydrogen, 6-12% argon, 45-54% nitrogen and, 25-33% methane. It will be appreciated by those skilled in the art that the present invention applies as well to feed streams that lie outside this composition range.

According to the present invention, the non-permeate feed gas stream 1 is passed to a PSA unit 2, which separates out a stream 3, comprising most of the nitrogen and essentially all of the methane. This methane containing stream 3 may be used as fuel for the primary reformer of the ammonia synthesis plant. The PSA product gas stream 4 is then passed through a membrane separator 5 to remove a major portion of the hydrogen. The separated hydrogen in stream 6 can be used as purge gas for regeneration of the PSA unit 2, as fuel, or optionally recycled to the ammonia synthesis loop. The product gas stream 7a, comprising argon and remaining quantities of hydrogen and nitrogen, is preferably pre-cooled with cold waste gas stream 9 and optionally expanded in a turbine for further cooling. The cooled stream 7b, is then treated in a cryogenic distillation unit 8 to produce essentially pure liquid argon, which exits as product stream 10. The remaining quantities of hydrogen and nitrogen exit from the cryogenic distillation unit 8 as distillate stream 9.

The distillate stream 9 can be used for pre-cooling the feed gas stream 1 and subsequently can be used as purge gas for regeneration of the PSA unit 2. The reflux for the distillation unit 8 is suitably provided by liquid nitrogen in a recirculating refrigeration loop with the column reboiler acting as the heat sink for a heat pump. Optionally, liquid nitrogen can be stored in tanks and circulated in metered amounts to provide the reflux. The nitrogen vapor can be sent to the ammonia plant air compressor. The small amount of cooling provided by nitrogen vapor will result in a marginal increase in air intake and favor improved compressor operation.

In a second embodiment, the product stream from the PSA unit may be directly treated in the cryogenic distillation unit. In a single column, pure argon may be produced as a bottom product and a hydrogen plus nitrogen mixture may be produced as a distillate stream. As mentioned before, this distillate stream can be used to cool the feed to the column and can be subsequently used as purge gas for PSA methane regeneration.

Figure 2:
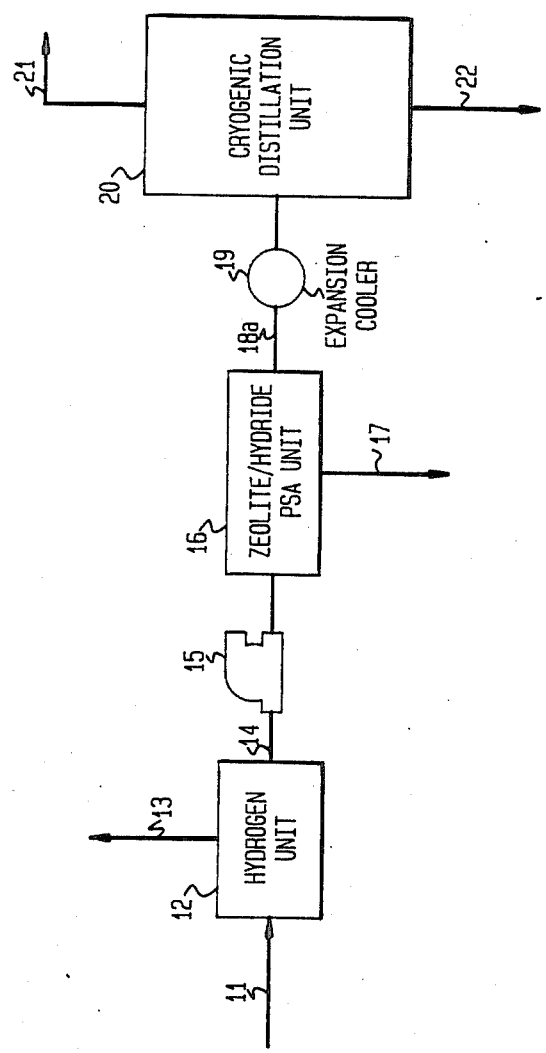
FIG. 2 is a schematic process flow diagram illustrating another embodiment of the present invention for treating hydrogen PSA waste gas.

Referring now to FIG. 2, a third embodiment of the present invention comprises, in place of a hydrogen membrane separator following the PSA unit, the incorporation of metal hydride material into the molecular sieve bed of the PSA unit, in order to accomplish the removal of hydrogen simultaneously with the removal of methane and nitrogen.

In this embodiment, an ammonia synthesis plant purge gas stream 11 enters a hydrogen PSA recovery unit 12, rather than a hydrogen membrane separator. The stream 13 comprises a highly concentrated hydrogen gas for recycle to the ammonia synthesis loop. The hydrogen depleted stream 14, comprising nitrogen, argon, methane, hydrogen, and ammonia, enters via a compressor 15 a PSA unit 16, where it is typically stepped up to a pressure in the range of 50 to 100 psia. The adsorption beds of the PSA unit comprise both molecular sieve and metal hydride material. The molecular sieve adsorbs essentially all of the methane, most of the nitrogen, and all of the ammonia. The metal hydrides adsorb most of the remaining hyrogen. The vent gas stream 17 thus comprises a mixture of ammonia, methane, nitrogen, and hydrogen. The argon enriched product stream 18a from the PSA unit 16 is then cooled and expanded in expansion means 19, such as an expansion valve or turbine, and is introduced into a cryogenic distillation column 20, which produces a distillate stream 21 consisting primarily of nitrogen, with traces of hydrogen, and a pure liquid argon final product stream 22. The distillate stream 21 can be used to purge the PSA unit 16, in addition to the purge inherently due to the hydrogen desorbing from the metal hydrides.

As the metal hydride material, a commercially available product, Hystor alloy 207 (La $Ni_{4.7}$ $Al_{0.3}$) from Ergenics in Wycoff, N.J., may be employed. A number of other commercially available hydride alloys may also be used. Within the PSA unit, the metal hydride material may be arranged in a two layered bed, with molecular sieve adsorbent material. Placing the metal hydride material on top of the molecular sieve adsorbent material is advantageous for two reasons. First, the capacity of the metal hydride material is better utilized, since the hydrogen partial pressure during adsorption is highest at the top of the bed and, secondly, because desorbed hydrogen would act as purge gas for desorption of methane from the molecular sieve adsorbent material.

The metal hydride material is suitably crushed to a fine powder for use in the beds of the PSA unit. The size of the crushed hydride is typically about 10 microns. The amount of metal hydride can be varied, as will be appreciated by those skilled in the art, in order to ensure that hydrogen in the product is below the allowable limit for the later cryogenic separation at the operating pressure necessary to produce pure liquid argon.

The hydrides may be placed in a separate bed on top of each zeolite bed to provide ease of replacement. A sintered metal disc filter is suitably employed at the top of the beds and may have a pore size of 5 microns or smaller to prevent particulate carry over. However, the particulate carry over problem may also be addressed in a different manner. The beds may be filled with three layers: first, a layer of pure zeolite, second, a layer of a hydride plus zeolite mixture and, finally, a layer of pure zeolite molecular sieve again.

In every case, the molecular sieve or activated carbon material contained in the PSA unit must have a greater selectivity for methane than argon. Both calcium and sodium aluminosilicate zeolites may be employed. Carbon molecular sieves and silica molecular sieves are also functional. Suitable zeolites include, but are not limited to the following: 5A, 10X, 13X, and mordenites. Preferred sieves are the 5A medical grade zeolite, commercially available from Union Carbide, the 5A HC sieve commercially available from Laporte Industries, or molecular sieves with comparable pore size and molecular attraction. The 5A medical grade zeolite provides excellent argon/methane selectivity and exhibits the ability to remove virtually all of the methane, so that the PSA product gas can contain as low as fractional part per million (ppm) levels of methane. Removal of the methane to low levels is an important criterion; any methane in the product gas concentrates in the pure argon product in the cryogenic distillation unit. Hence, expensive downstream purification steps would be required if the PSA product gas were to contain undesirable levels of methane. A methane level equal to or less than 20 ppm is typically required in the product, a methane level of 1 ppm is desired, and a methane level of 0.5 ppm or below is preferred.

A suitable operating pressure for the PSA unit is in the range of 25 psig to 1000 psig. A range of 100 to 400 psig is preferred. By varying the product to feed ratio, either by changing the product flow or cycle time, the argon yield at various operating pressures corresponding to zero methane concentration in the product can be determined by thermal conductivity analysis of the PSA product stream using a gas chromatograph. There is a moderate reduction in argon yield with increasing pressure. The variation of argon yield with pressure indicates that the separation of methane is regeneration controlled; the higher the amount of methane removed during PSA bed regeneration, the better will be the argon/methane selectivity.

The PSA unit must be regenerated periodically. Suitable modes of regeneration include (i) regeneration at atmospheric pressure coupled with product purge, (ii) regeneration at or below 25 psia coupled with purge using hydrogen or a hydrogen-nitrogen mixture at low pressures (about 15 psig), and (iii) vacuum regeneration.

When using product purge, it may be advantageous to restrict the purge to different portions of the half cycle. Typically, the product released immediately after pressurization of the bed contains mostly hydrogen. Therefore, it is advantageous to restrict purge to two time periods; the first period is immediately following pressurization of the adsorbing bed, and the second period is towards the end of the half cycle when product purity is in decline. By suitable choice of time for the two purge steps, the maximum argon yield using this mode of regeneration can be determined together with the minimum product hydrogen concentration. Advantages of product purge are that relatively lower energy is required for regeneration, and the hydrogen concentration in the product is comparatively low.

A disadvantage of product purge is relatively low argon yield as a result of the loss of the product purge gas itself. For separating all of the methane in the feed gas, the purge gas requirement typically accounts for greater than 30 percent of the argon lost. As an alternative to product purge, the hydrogen rich stream 6 shown in FIG. 1 is ideal for use as purge. In the first embodiment of the present invention, the hydrogen rich stream 6, separated by the membrane 5, will be at low pressure (about 15 psig) and is consequently not of much value for recycling to the ammonia synthesis loop. It can therefore be profitably used as purge gas.

An alternate mode of regeneration in the present invention is vacuum regeneration. The yield obtained using vacuum regeneration is generally superior to the yield using hydrogen purge or product purge. Vacuum regeneration, however, increases the capital investment for the process slightly and the energy requirement appreciably. Since the vent stream is used as a fuel, recompression to about 25 psia is also necessary unless special lower pressure burners are used. In determining the best regeneration procedure, the increase in argon yield that results with vacuum regeneration must be weighed against the incremental capital cost and energy changes.

The various embodiments described above for argon recovery from the membrane non-permeate gas in $NH_3$ plants are also equally applicable to argon recovery in $NH_3$ plants which have installed on them PSA or cryogenic $H_2$ recovery units. The argon rich streams from these units are at low pressure as opposed to the non-permeate stream which is typically at 1900 psig. In contrast, after hydrogen PSA, the argon rich stream is typically at 8 psia to 25 psia and, after cryogenic hydrogen recovery, the argon rich stream is typically at 25 psia to 100 psia. The feed stream from $H_2$-PSA units will require recompression to 50–100 psig, whereas the cryogenic plant feed may only optionally require recompression. Following recompression, the embodiments discussed above for post-membrane treatment are applicable. Any ammonia in the feed is separated along with methane in the zeolite PSA.

The following working examples illustrate a design for each of the three embodiments, based on experiments or, where appropriate, theoretical calculations assuming well mixed streams.

EXAMPLE 1

Figure 3:
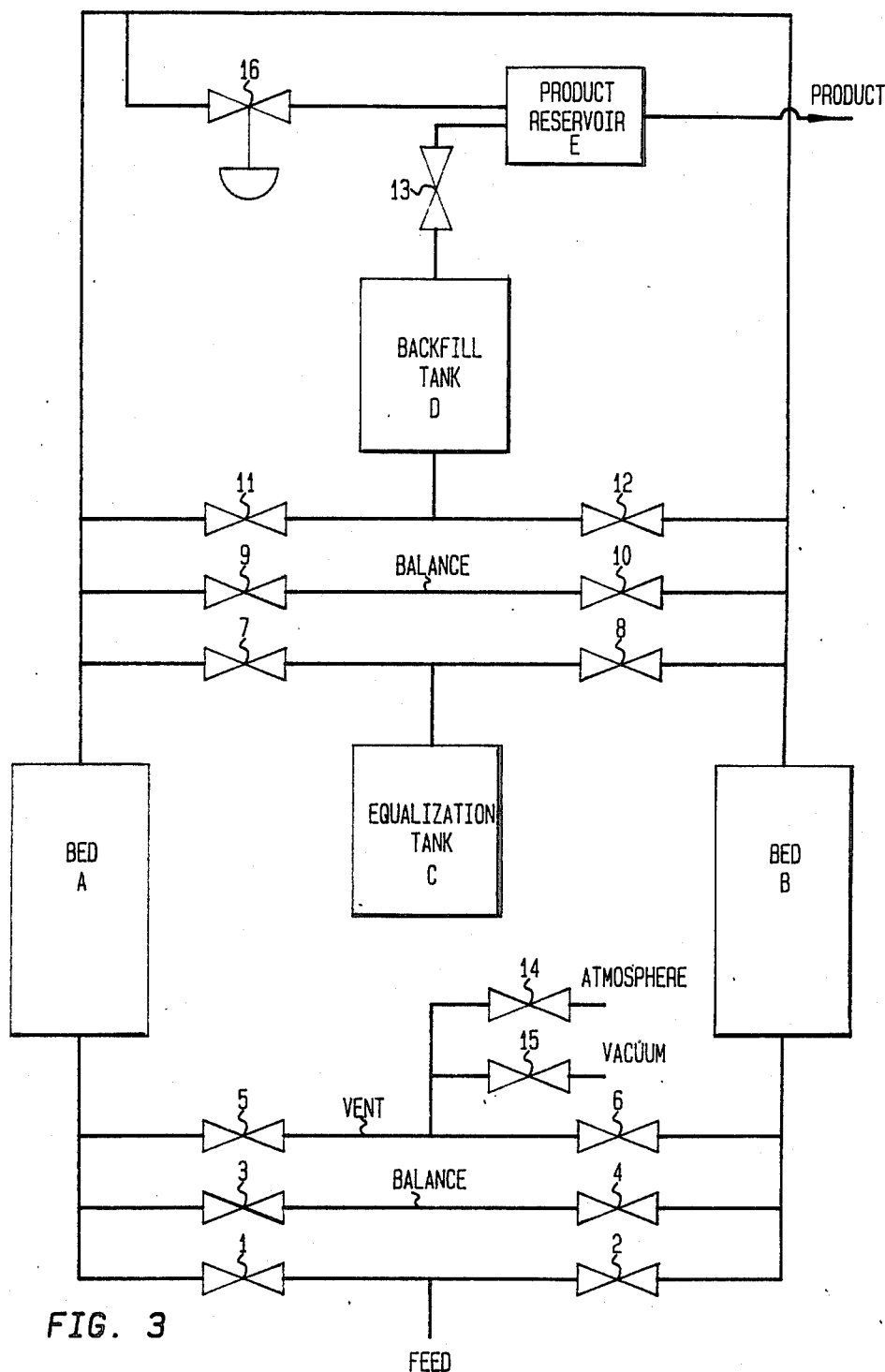
FIG. 3 is a schematic of one possible configuration of the PSA unit, illustrating valve positions and auxiliary equipment.
Figure 4:
FIG. 4 is a timing diagram illustrating a full cycle sequence of PSA operation corresponding to the configuration shown in FIG. 3.

This example illustrates a design based on the second embodiment of the present invention. An ammonia synthesis plant purge stream comprising approximately 60.5% $H_2$, 20% $N_2$, 4.5% Ar, 13% $CH_4$, and 2% $NH_3$ enters a pre-treatment section consisting of a water scrubber to remove ammonia. Pre-treated gas then enters a PRISM$^R$ membrane system, producing two streams: a first hydrogen rich permeate stream for recycle, comprising 85.4% $H_2$, 5.3% $N_2$, 8% $CH_4$ and 1.3% Ar and a second argon enriched non-permeate stream comprising 9% $H_2$, 54% $N_2$ 12% Ar and 25% $CH_4$. At a pressure of 150 psig, the non-permeate stream is fed to a PSA unit, at ambient temperature, comprising beds containing 5A medical grade aluminosilicate zeolite. A typical PSA configuration depicting the various valves is shown in FIG. 3. Referring to FIG. 3, the PSA unit comprises adsorption bed A, adsorption bed B, equalization tank C, backfill tank D, product reservoir E, backpressure regulator 16 and valves 1 through 15. The PSA unit is operated in accordance with the full cycle sequence shown in Table I. FIG. 41 shows a timing diagram for the full cycle sequence.

TABLE I

| Step No | Bed A | Bed B | Valves Open |
|---|---|---|---|
| 1 | Bed balance | Bed balance | 3, 4, 9, 10, 13 |
| 2 | Feed Pressurization | Equalization with tank | 1, 8, 13 |
| 3 | Feed Pressurization | Vent to atmosphere | 1, 6, 14, 13 |
| 4 | Constant feed & product release | Vacuum regeneration | 1, 6, 15, 13 |
| 5 | Constant feed & product release | Equalization with tank | 1, 8, 13 |
| 6 | Constant feed & product release | Product backfill | 1, 12 |
| 7 | Bed balance | Bed balance | 3, 4, 9, 10, 13 |
| 8 | Equalization with tank | Feed pressurization | 2, 7, 13 |
| 9 | Vent to atmosphere | Feed pressurization | 2, 5, 14, 13 |
| 10 | Vacuum regeneration | Constant feed and product release | 2, 5, 15, 13 |
| 11 | Equalization with tank | Constant feed and product release | 2, 7, 13 |
| 12 | Product backfill | Constant feed and product release | 2, 11 |

Essentially all of the $CH_4$ and greater than 80% of the $N_2$ are removed in the vent stream of this PSA unit by using 1.5 psia (100 Torr) absolute vacuum. The PSA product gas is cryogenically distilled to produce pure liquid argon as a column bottom product. The temperature and pressure conditions, flow rates and composition of various streams are summarized in Table II.

TABLE II

| Stream (in FIG. 1) | Temp. (K) | Pressure (psia) | Flow Rate (Units/Min) | Composition (Volume Percent) | | | |
|---|---|---|---|---|---|---|---|
| | | | | $H_2$ | Ar | $N_2$ | $CH_4$ |
| 1 | 298 | 150 | 100.0 | 9.0 | 12.0 | 54.0 | 25.0 |
| 3 | 293 | Min 25 Min 1.5 Max 25 | 74.3 | 0.6 | 4.0 | 61.7 | 33.7 |
| 4 | 303 | 150 | 25.7 | 33.3 | 35.1 | 31.6 | — |
| 7b | 116 | 45 | 25.7 | 33.3 | 35.1 | 31.6 | — |
| 9 | 83 | 42 | 16.9 | 50.5 | 1.6 | 47.9 | — |
| 10 | 98 | 40 | 8.8 | — | 100.0 | — | — |

EXAMPLE 2

This example illustrates a design based on the first embodiment of the present invention. The non-permeate feed stream is treated in a 2-bed PSA at 400 psig. The PSA configuration is similar to the one shown for Example 1. Purge gas is used for PSA regeneration and hence application of vacuum is either relaxed or eliminated. In this particular example, the vent pressure is atmospheric. The PSA product gas is treated in a membrane to give two products: the hydrogen rich permeate at 30 psia is used as purge gas for PSA regeneration, while the argon rich non-permeate is cryogenically distilled as in Example 1 to produce pure liquid argon as a bottom product. Temperature, pressure, flow rate and composition of various streams are summarized in Table III.

TABLE III

| Stream (in FIG.-1) | Temp. (K) | Pressure (psia) | Flow Rate (units/min) | Composition (Volume Perent) | | | |
|---|---|---|---|---|---|---|---|
| | | | | $H_2$ | Ar | $N_2$ | $CH_4$ |
| 1 | 298 | 400 Min 200 | 100.0 | 9.0 | 12.0 | 54.0 | 25.0 |
| 3 | 293 | Min 1.5 Max 25 | 81.9 | 9.1 | 4.3 | 56.1 | 30.5 |
| 4 | 303 | 400 | 27.5 | 36.0 | 33.1 | 30.9 | — |
| 6 | 303 | Min 20 Max 35 | 9.4 | 88.4 | 7.5 | 4.1 | — |
| 7a | 303 | 400 | 18.1 | 8.8 | 46.5 | 44.7 | — |
| 7b | 116 | 40 | 18.1 | 8.8 | 46.5 | 44.7 | — |
| 9 | 83 | 35 | 10.0 | 16.0 | 2.5 | 81.5 | — |
| 10 | 96 | 33 | 8.1 | — | 100.0 | $1 \times 10^{-4}$ | $1 \times 10^{-4}$ |

EXAMPLE 3

The example illustrates a design based on the third embodiment of the present invention. The non-permeate feed stream at 400 psig pressure is treated in a 2-bed PSA system. The beds contain metal hydride (Hystor$^R$ alloy 207) and zeolite in a two layered arrangement and in the approximate weight ratio 1:6. The metal hydride is located at the product end of the bed. All of the $CH_4$, 70% of the $H_2$ and greater than 80% of the $N_2$ are removed in the vent stream with regeneration at vacuum (1.5 psia). The argon rich product gas from the PSA is cryogenically distilled to produce pure liquid argon as bottom product. Temperature, pressure, flow rate and composition of various streams are summarized in Table IV.

TABLE IV

| Stream (FIG.-1) | Temp. (K) | Pressure (psia) | Flow Rate (Units/Min) | Composition | | | |
|---|---|---|---|---|---|---|---|
| | | | | $H_2$ | Ar | $N_2$ | $CH_4$ |
| 1 | 298 | 400 | 100.0 | 9.0 | 12.0 | 54.0 | 25.0 |
| 3 | 293 | Min 1.5 Max 25 | 78.1 | 8.1 | 4.6 | 55.3 | 32.0 |
| 4 | 303 | 400 | 21.9 | 12.3 | 38.4 | 49.3 | — |
| 7b | 116 | 40 | 21.9 | 12.3 | 38.4 | 49.3 | — |
| 9 | 83 | 35 | 13.8 | 19.6 | 1.80 | 78.6 | — |
| 10 | 98 | 33 | 8.1 | — | 100 | — | — |

Modifications to the described embodiments, within the scope and spirit of the present invention, will be evident to those skilled in the art. For example, vacuum regeneration could be replaced with purge gas regeneration. The purge gas may be heated before passage through the PSA for regeneration. In addition, feed gas may be cooled to give a favorable temperature swing.

We claim:

1. A process for recovery of argon from a gas stream comprising hydrogen, nitrogen, methane, and argon comprising the following steps:
   (i) passing said gas stream through a pressure swing adsorption means to separate essentially all of the methane and most of the nitrogen, thereby producing a product stream comprising a predominant amount of argon; and
   (ii) passing said product stream to a means for separating out most of the hydrogen to produce a hydrogen depleted product; and
   (iii) passing said hydrogen depleted product stream to a cryogenic distillation means to produce an essentially pure argon final product by separating out the remaining hydrogen and nitrogen.

2. The process of claim 1, wherein said pressure swing adsorption means comprises at least one adsorption bed containing a adsorbent material which has a greater selectivity for methane than argon.

3. The process of claim 2, wherein said adsorbent material is a molecular sieve or activated carbon.

4. The process of claim 3, wherein said molecular sieve adsorbent material is an aluminosilicate zeolite.

5. The process of claims 4, wherein said zeolite is selected from the group consisting of 5A, 10X, 13X, or mordenites.

6. The process of claim 5, wherein said zeolite comprises 5A medical grade sieve or 5A HC sieve.

7. The process of claim 2, wherein said means for separating out hydrogen is one or more beds comprising metal hydrides.

8. The process of claim 7, wherein said metal hydrides are incorporated into said adsorption bed.

9. The process of claim 8, wherein said metal hydrides forms a discrete alternate layer with said molecular sieve adsorbent material in said adsorption bed of said pressure swing adsorption means.

10. The process of claim 8, wherein a layer of hydride-zeolite mixture is placed between two zeolite layers in said adsorption bed.

11. The process of claim 2, wherein periodically said adsorption bed is regenerated with a purge gas.

12. The process of claim 11, wherein said purge gas is the hydrogen rich stream exiting from said means for separating out hydrogen.

13. The process of claim 11, wherein the purge gas is a hydrogen and nitrogen gaseous mixture exiting from the top of said cryogenic distillation means.

14. The process of claim 11, wherein said purge gas is recycled product gas.

15. The process of claim 14, wherein the product purge is introduced in two steps, one immediately following bed pressurization and one at the end of regeneration.

16. The process of claim 14, wherein said methane concentration is less than or equal to 1 ppm.

17. The process of claim 2, wherein periodically said adsorption bed undergoes vacuum regeneration.

18. The process of claim 2, wherein the methane concentration in said product is equal to or less than 20 ppm.

19. The process of claim 2, wherein one or more equalization tanks are connected to the adsorption beds to reduce void gas loss.

20. The process of claim 2, wherein a product backfill repressurization step is included to increase product purity.

21. The process of claim 2, wherein the feed gas to said pressure swing adsorption is cooled by expansion from a high pressure to the operating pressure of said pressure swing adsorption means.

22. The process of claim 1, wherein said means for separating hydrogen is a membrane separator.

23. The process of claim 1, wherein the operating pressure of said adsorption bed ranges from 25 psig to 1000 psig.

24. The process of claim 23, wherein the operating pressure ranges from 100 to 400 psig.

25. The process of claim 1, wherein refrigeration for said cryogenic distillation means is obtained by recirculating a refrigerant in a refrigerator heat pump cycle and using the column reboiler of said cryogenic distillation means as a heat sink for the cycle.

26. The process of claim 25, wherein pressure energy of a high pressure non-permeate gas, through the use of a turbine, is used to drive a compressor for circulating said refrigerant.

27. The process of claim 1, wherein refrigeration for said cryogenic distillation means is obtained by vaporizing liquid nitrogen from storage tanks and passing the nitrogen vapor to an ammonia synthesis compressor air intake section.

28. The process of claim 1, wherein the product stream from said pressure swing adsorption means is cooled by heat exchange with waste gas leaving said cryogenic distillation means and by expansion to the pressure of said cryogenic distillation means before entering the same.

29. The process of claim 1, wherein any ammonia or residual water present in the said gas stream entering the pressure swing adsorption means is discharged in the vent gas of said pressure swing adsorption means.

30. A process for the recovery of argon from a gas stream comprising hydrogen, nitrogen, methane and argon comprising passing said gas stream through a pressure swing adsorption means for separating essentially all of the methane and most of the nitrogen, thereby producing a product stream comprising a predominant amount of argon, and passing said product stream to a cryogenic distillation column for separating out hydrogen and nitrogen and producing an essentially pure argon product.

* * * * *